United States Patent Office

2,848,479
Patented Aug. 19, 1958

2,848,479

MONOMERIC ESTERS OF N,N'-BIS(P-CARBOXY-BENZOYL)ALKYLENEDIAMINE

Jack L. R. Williams and Thomas M. Laakso, Rochester, N. Y., assignors to Eastman Kodak Company, Rochester, N. Y., a corporation of New Jersey No Drawing. Application April 26, 1955
Serial No. 504,105

11 Claims. (Cl. 260—471)

This invention relates to monomeric esters particularly adapted for use as bifunctional reactants in the formation of improved condensation polymers, and is particularly concerned with monomeric diesters of compounds of the formula

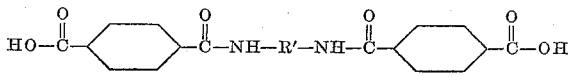

wherein R' is a polymethylene group containing 2–10 carbon atoms, which show particular utility as bifunctional dicarboxylates in the preparation of polyesters and copolyesters.

Condensation polymers can be prepared by reaction of bifunctional components such as glycols and dicarboxylic acids (usually in ester form), dicarboxylic acids and diamines, aminoacids and glycols, aminoalcohols and dicarboxylic acids, and similar combinations of bifunctional reactants. The products which found widest utility heretofore are the polyesters prepared by condensing one or more dicarboxylic acids with one or more glycols, and the polyamides prepared by condensing one or more dicarboxylic acids with one or more diamines. The preparation of condensation polymers of various kinds is described in Carothers 2,071,250.

The polyesters and the polyamides each possessed certain advantages but achieved the desirable properties at the sacrifice of other characteristics. Consequently, attempts were made to make modified polymers by coreacting a dicarboxylic acid, a glycol and a diamine to form polyester-amides having the properties of both the polyesters and the polyamides. Such heterogeneous polyester-amides did not give the desired combination of properties, however, and have not achieved commercial success.

As disclosed in the application of Laakso and Williams Serial No. 504,107, filed concurrently herewith, the desired combination of properties of polyesters and polyamides are obtained without sacrificing the desirable properties of either by condensing one or more glycols with one or more dicarboxylate monomers of a particular kind, as specifically described and claimed hereinafter. Thus, the monomers of this invention have made possible a completely new type of condensation polymer having excellent utility in both fiber and film applications.

It is therefore an object of this invention to provide new monomeric materials having particular utility in the manufacture of condensation polymers.

It is another object of the invention to provide new monomeric bifunctional esters containing internal amide linkages effective to improve dyeability, moisture absorption, and the like, of polymers formed therefrom without the disadvantages normally inherent in amine containing polymers such as objectionable color formation, lowered softening point, and the like.

A further object of the invention is to provide new bifunctional reactants characterized by excellent stability under condensation polymerization conditions and thereby capable of entering into polyester condensation to form polyester-amide polymers having a regularity of structure which could not be attained heretofore.

Another object of the invention is to provide monomeric esters useful in the manufacture of condensation polymers having unusual utility in fiber and film applications.

Other objects will be apparent from the description and claims which follow.

These and other objects are attained by means of this invention as described in detail hereinafter with particular reference to certain preferred embodiments thereof. The monomeric esters embodying the invention are esters of dicarboxylic acids of the formula

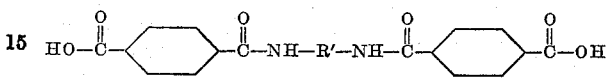

wherein R' is an alkylene group, preferably a polymethylene group, containing 2–10 carbon atoms. Any of the various esters of such dicarboxylic acids are of utility in condensation polymerizations with glycols since the ester group is split off in the initial ester-interchange stage of the reaction. Thus in the monomeric esters embodying the invention and having the formula

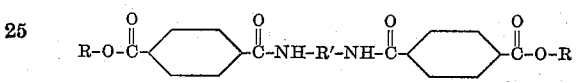

R can be an aryl group, an alkyl group or an aralkyl group as desired. Preferably, for convenience and economy, R is a phenyl group or an alkyl group, with the lower alkyl groups containing 1–6 carbon atoms being preferred for ease in removing the alcohol liberated in ester-interchange with a glycol. In some cases, it is even desirable to use the free dicarboxylic acid, and this is also within the scope of the invention. When the monomeric ester is an alkyl diester of the dicarboxylic acid, the alkyl groups can be either straight or branched chain as desired, and the two groups can be the same or different groups within the scope of the invention. The ester-forming groups are considered as the functional equivalent of the esters themselves, such as the halides, amines and the like.

Thus, the compounds embodying the invention are typified by but not limited to the methyl, ethyl, propyl, isopropyl, butyl, isobutyl, hexyl, phenyl or other esters of such dicarboxylic acids as N,N'-bis(p-carboxybenzoyl)-ethylene diamine, N,N'-bis(p-carboxybenzoyl)trimethylene diamine, N,N'-bis(p-carboxybenzoyl)tetramethylene diamine, N,N'-bis(p-carboxybenzoyl)pentamethylene diamine, N,N'-bis(p-carboxybenzoyl)hexamethylene diamine, N,N'-bis(p-carboxybenzoyl)heptamethylene diamine, N,N'-bis(p-carboxybenzoyl)octamethylene diamine, N,N'-bis(p-carboxybenzoyl)nonamethylene diamine, and N,N'-bis(p-carboxybenzoyl)decamethylene diamine. Of these materials, the lower alkyl diesters of N,N'-bis(p-carboxybenzoyl)ethylene diamine, N,N'-bis-(p-carboxybenzoyl)pentamethylene diamine and N,N'-bis(p-carboxybenzoyl)hexamethylene diamine are of greatest utility in the preparation of condensation polymers for fiber or film manufacture with the methyl, ethyl and isobutyl diesters of N,N'-bis(p-carboxybenzoyl)hexamethylene diamine being particularly useful.

The compounds embodying the invention can be prepared by any process effective to give the monomeric ester. Usually it is difficult to obtain the monomer by direct methods without polymerization, such as by direct reaction of the dicarboxylic acid and diamine. Consequently, it is usually preferable to prepare the dicarboxylate monomers by reacting the desired polymethylene diamine with at least two molar proportions of a p-carbalkoxybenzoyl halide under controlled conditions, e. g. at temperatures below about 50° C. The polymethylene diamine can be employed in free form or in the form of a salt such as the hydrochloride, and the p-carbalkoxybenzoyl chlorides are preferably employed. The monomers are usually high melting solids which can be precipitated out of cold water or otherwise recovered in very high yields.

The preparation of typical monomers embodying the invention is illustrated by the following examples, it being understood that any of the other monomers within the scope of the invention can likewise be prepared in similar fashion.

*Example 1*

To a solution of 161 g. (1 mole) of butane-1,4-diamine dihydrochloride in 500 ml. of water was added a solution of 80 g. (2 moles) of sodium hydroxide in 300 ml. of water, all at once with stirring. One liter of benzene was added, followed by 198.5 g. (1 mole) of p-carbomethoxybenzoyl chloride added all at once with efficient stirring. After five minutes, 150 ml. (1 mole) of sodium hydroxide solution was added rapidly from a dropping funnel. Thereafter, an additional 198.5 g. of p-carbomethoxybenzoyl chloride and an 150 ml. of sodium hydroxide solution were added in successive portions with 15 minutes stirring between additions. The reaction mixture was stirred for one hour and then precipitated in cold water. The white product was filtered, washed well with water and dried. Recrystallization from dimethyl formamide, washing with alcohol and drying gave 312 g. (75.7% yield) of white crystalline N,N'-bis(p-carbomethoxybenzoyl)tetramethylene diamine having a melting point of 255–256° C. and a molecular weight of 412. The calculated analysis for $C_{22}H_{26}O_6N_2$ was C, 64.3; H, 5.8 and N, 6.8 which compared to the actual analysis of C, 64.1; H, 6.1 and N, 7.2.

*Example 2*

Under essentially anhydrous conditions, 198.5 g. (1 mole) of p-carbomethoxybenzoyl chloride was added dropwise to a well stirred solution of 58 g. (0.5 mole) of hexamethylene diamine in 1000 ml. of dry pyridine. The temperature of the reaction mixture did not exceed 50° C. during the addition. After one hour of stirring, the reaction slurry was precipitated in ice water, and the cream colored precipitate was filtered out. The dry crude product was recrystallized from alcohol to give 139 g. of pure white N,N'-bis(p-carbomethoxybenzoyl)hexamethylene diamine having a molecular weight of 440. The analysis, calculated for $C_{24}H_{28}O_6N_2$ was C, 65.4; H, 6.4 and N, 6.4, and actual was C, 65.8; H, 6.4 and N, 6.2.

*Example 3*

Under essentially dry conditions, 20 g. (0.3 mole) of ethylene diamine was dissolved in 250 ml. of dry pyridine and chilled to 0° C. With efficient stirring, 127.5 g. (0.6 mole) of p-carbethoxybenzoyl chloride was added slowly, while maintaining the temperature between 0° and 10° C. by regulating the rate of addition of the acid chloride. After being stirred for 15 minutes, the reaction mixture was poured into ice water. The light cream colored solid which precipitated was filtered by suction. After recrystallization from ethyl alcohol, pure white N,N'-bis(p-carbethoxybenzoyl)ethylene diamine melting at 245.5°–246° C. was obtained in 90% yield.

*Example 4*

Under essentially dry conditions, 34.8 g. (0.3 mole) of hexamethylene diamine was dissolved in 500 ml. of dry pyridine and chilled to 0° C. With efficient stirring, 127.5 g. (0.6 mole) of p-carbethoxybenzoyl chloride was added slowly while maintaining the temperature at 0°–10° C. The reaction mixture was stirred for 15 minutes and then poured into ice water. The light cream colored solid which precipitated was filtered by suction. After recrystallization from ethyl alcohol, pure white N,N' - bis(p - carbethoxybenzoyl)hexamethylene diamine melting at 207–208° C. was obtained in 88.8% yield.

*Example 5*

Because of the improved solubility of the various reactants, intermediates and products in common solvents such as alcohols, ethers, ketones and esters, the isobutyl compounds are desirably employed. A mixture of 4 kg. (20.6 moles) of dimethyl terephthalate, 14 liters of isobutyl alcohol and 25 ml. of tetra-n-butyl titanate catalyst was heated with partial takeoff so that the temperature of the distillate was maintained at 64–68° C. After approximately 1500 ml. of distillate was obtained, the takeoff temperature was allowed to rise slowly until the distillate temperature was 105° C. for 30 minutes. The reaction solution was then cooled to 50° C. To this solution of diisobutyl terephthalate was added rapidly at 50° C. a solution of 1200 g. (21.4 moles) of potassium hydroxide in 2 liters of water and 8 liters of isobutyl alcohol. The reaction mixture was allowed to stand with occasional stirring for 30 minutes and was then poured into a mixture of 4 liters of concentrated hydrochloric acid and 85 gallons of cold water. The resulting white precipitate of crude half-ester was filtered, washed and dried at 50° C. in circulating air to give an average yield of 4835 g. of crude p-carboisobutoxybenzoic acid. After recrystallization from toluene, a 69.4% yield of white p-carboisobutoxybenzoic acid melting at 152–155° C. was obtained. A mixture of 3205 g. (14.4 moles) of p-carboisobutoxybenzoic acid and 3500 g. (29 moles) of thionyl chloride was heated under reflux overnight, filtered, and the excess thionyl chloride removed by distillation. The residual oil was distilled at 155–157° C. and 7 mm. pressure to give a 90% yield of p-carboisobutoxybenzoyl chloride melting at 36–37° C. To a well-stirred mixture of 16 liters of water and 1084 g. (6.5 moles) of 72% aqueous hexamethylene diamine solution was slowly added simultaneously 3125 g. (13 moles) of p-carboisobutoxybenzoyl chloride dissolved in an equal volume of benzene and 520 g. (13 moles) of sodium hydroxide dissolved in enough water to equal the volume of the acid chloride-benzene solution. The addition was regulated so as to have a slight excess of the acid chloride in the reaction at all times. The addition was completed in about 2 hours followed by another hour of stirring. The resulting granular precipitate was filtered, water washed twice, dried at 50° C., and dissolved in boiling isobutyl alcohol. The solution was filtered and then cooled to precipitate product. After being washed with methanol and dried, 2715 g. of white N,N'-bis(p-carboisobutoxybenzoyl)hexamethylene diamine melting at 165–166° C. was obtained.

*Example 6*

To a solution of 51.8 g. of ethylene diamine in 3 liters of dry pyridine, there was added 415 g. of p-carboisobutoxybenzoyl chloride over a period of one hour at 40–50° C. with stirring. The reaction mixture was then precipitated by pouring into cold water, and the product was filtered out and recrystallized from alcohol to give 216 g. of N,N'-bis(p-carboisobutoxybenzoyl)ethylene diamine melting at 196–197° C.

Any of the other dicarboxylate monomers as described herein can be similarly prepared. The N,N'-bis(p-carbalkoxybenzoyl) alkylene diamine monomers can be readily condensed with one or more straight or branched chain glycols such as ethylene glycol, trimethylene glycol, tetramethylene glycol, pentamethylene glycol, hexamethylene glycol, octamethylene glycol, decamethylene glycol, 2,2-dimethyl-1,3-propanediol or the like, with or without another bifunctional reactant such as terephthalic acid, 4,4-bis-sulfonyl dibenzoic acid, to form highly polymerized materials capable of orientation and useful for the manufacture of synthetic fibers or films such as sheeting or film base for photographic film support. The monomers embodying the invention can be prepared either batchwise or continuously, and their monomeric character makes possible the preparation of homogeneous condensation polymers containing amide groups effective to greatly enhance dyeability and moisture absorption without the deleterious effects of competing polyester and polyamide reactions in the polymerization.

The invention has been described in detail with particular reference to certain preferred embodiments thereof, but it will be understood that variations and modifications can be effected within the spirit and scope of the invention as described hereinabove and as defined in the appended claims.

We claim:

1. A monomeric diester of the dicarboxylic compound of the formula

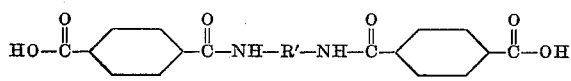

wherein R' is a polymethylene group of 2–10 carbon atoms.

2. A monomeric compound of the formula

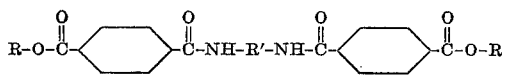

wherein R is a lower alkyl group and R' is a polymethylene group of 2–10 carbon atoms.

3. A monomeric lower alkyl diester of the compound of the formula

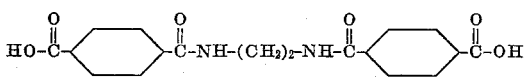

4. A monomeric lower alkyl diester of the compound of the formula

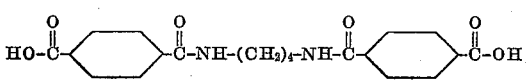

5. A monomeric lower alkyl diester of the compound of the formula

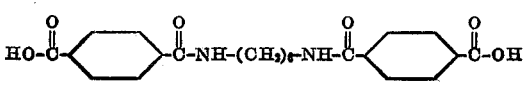

6. The monomeric compound of the formula

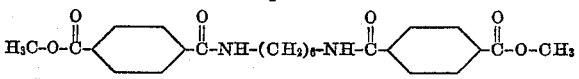

7. The monomeric compound of the formula

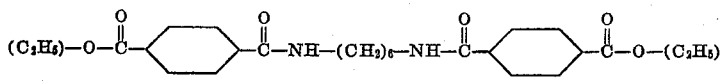

8. The monomeric compound of the formula

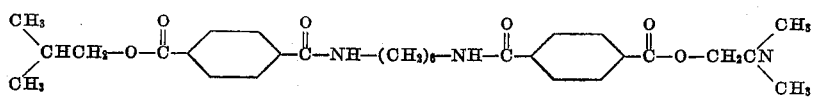

9. A monomeric methyl diester of a compound of the formula

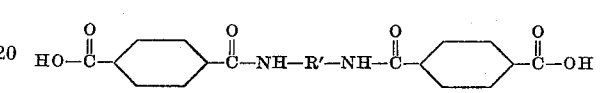

wherein R' is a polymethylene group of 2–10 carbon atoms.

10. A monomeric ethyl diester of a compound of the formula

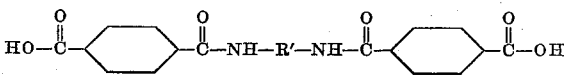

wherein R' is a polymethylene group of 2–10 carbon atoms.

11. A monomeric isobutyl diester of a compound of the formula

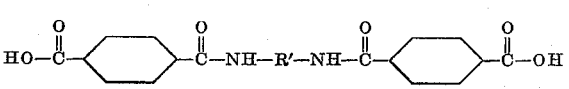

wherein R' is a polymethylene group of 2–10 carbon atoms.

References Cited in the file of this patent

UNITED STATES PATENTS 2,071,250     Carothers _____ Feb. 16, 1937

FOREIGN PATENTS 1,001,913     France _____ Oct. 31, 1951

OTHER REFERENCES

Beilstein, 9, 813 (1926).